US011905980B2

(12) United States Patent
Krane et al.

(10) Patent No.: US 11,905,980 B2
(45) Date of Patent: Feb. 20, 2024

(54) POWER TRANSFER UNIT WITH BREAKOUT FRICTION REDUCTION AND LEAKAGE REDUCTION

(71) Applicant: Parker-Hannifin Corporation, Cleveland, OH (US)

(72) Inventors: Steven A. Krane, Cochise, AZ (US); Dean R. Pollee, Mattawan, MI (US); Scott N. Johns, Butte, MT (US); David A. Scranton, Kalamazoo, MI (US); Bernard J. Strehlow, Otsego, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 108 days.

(21) Appl. No.: 17/614,799

(22) PCT Filed: May 26, 2020

(86) PCT No.: PCT/US2020/034491
§ 371 (c)(1),
(2) Date: Nov. 29, 2021

(87) PCT Pub. No.: WO2020/263479
PCT Pub. Date: Dec. 30, 2020

(65) Prior Publication Data
US 2022/0228609 A1 Jul. 21, 2022

Related U.S. Application Data

(60) Provisional application No. 62/866,912, filed on Jun. 26, 2019.

(51) Int. Cl.
*F15B 20/00* (2006.01)
*B64C 13/42* (2006.01)
*F15B 3/00* (2006.01)

(52) U.S. Cl.
CPC ............ *F15B 20/004* (2013.01); *B64C 13/42* (2013.01); *F15B 3/00* (2013.01);
(Continued)

(58) Field of Classification Search
CPC .......... B64C 13/42; F15B 3/00; F15B 20/004; F15B 2211/214
See application file for complete search history.

(56) References Cited

U.S. PATENT DOCUMENTS 3,369,491 A * 2/1968 Hoffer ...................... F15B 3/00
60/426
4,168,652 A * 9/1979 Bick ....................... F16H 39/04
60/403

(Continued)

FOREIGN PATENT DOCUMENTS

| WO | 2013014224 A2 | 1/2013 |
| WO | 2014005060 A1 | 1/2014 |
| WO | 2016153784 A1 | 9/2016 |

OTHER PUBLICATIONS

International Search Report and Written Opinion dated Sep. 17, 2020, for priority International Patent Application No. PCT/US2020/034491.

*Primary Examiner* — Kenneth Bomberg
*Assistant Examiner* — Matthew Wiblin
(74) *Attorney, Agent, or Firm* — Renner, Otto, Boisselle & Sklar, LLP

(57) ABSTRACT

A power transfer unit includes a first hydraulic circuit, a second hydraulic circuit fluidly connected to the first hydraulic circuit, a pump and motor assembly fluidly connected between the first hydraulic circuit and the second hydraulic circuit, an isolation valve arranged along the first hydraulic circuit and fluidly connected to an inlet of the pump and motor assembly. The isolation valve is movable between a closed position and an open position to prevent (Continued)

and enable high-pressure fluid flow to the inlet, respectively. An unloader valve is arranged along the second hydraulic circuit and fluidly connected to an outlet of the pump and motor assembly, and an orifice is arranged along the second hydraulic circuit and fluidly connected to the unloader valve to reduce back pressure in the second hydraulic circuit.

15 Claims, 12 Drawing Sheets

(52) U.S. Cl.
CPC .............. *F15B 2211/20507* (2013.01); *F15B 2211/20538* (2013.01); *F15B 2211/20569* (2013.01); *F15B 2211/20592* (2013.01); *F15B 2211/275* (2013.01); *F15B 2211/40507* (2013.01); *F15B 2211/41563* (2013.01); *F15B 2211/50518* (2013.01); *F15B 2211/50536* (2013.01); *F15B 2211/50563* (2013.01); *F15B 2211/5157* (2013.01); *F15B 2211/6355* (2013.01); *F15B 2211/7058* (2013.01); *F15B 2211/7142* (2013.01); *F15B 2211/8633* (2013.01); *F15B 2211/875* (2013.01)

(56) References Cited

U.S. PATENT DOCUMENTS

| | | | |
|---|---|---|---|
| 4,286,927 A | 9/1981 | Boehringer | |
| 4,763,472 A * | 8/1988 | McGowan | F01B 3/02 60/420 |
| 4,784,579 A | 11/1988 | Gazzera | |
| 5,325,669 A | 7/1994 | Barker et al. | |
| 5,794,437 A * | 8/1998 | Lisniansky | F03C 1/003 60/451 |
| 6,349,543 B1 * | 2/2002 | Lisniansky | F15B 11/024 60/419 |
| 2013/0318955 A1 * | 12/2013 | Zhang | E02F 9/2296 60/413 |
| 2014/0004986 A1 | 1/2014 | Sharpe | |
| 2014/0140864 A1 * | 5/2014 | Harten | F04B 9/02 417/539 |

* cited by examiner

POWER TRANSFER UNIT WITH BREAKOUT FRICTION REDUCTION AND LEAKAGE REDUCTION

This application is a national phase of International Application No. PCT/US2020/034491 filed May 26, 2020, which claims priority to U.S. Application No. 62/866,912 filed Jun. 26, 2019, the entire disclosures of which are hereby incorporated by reference.

FIELD OF INVENTION

The present invention relates to power transfer units that are used to transfer hydraulic power from one hydraulic system to another without mixing fluid, and more particularly to power transfer units for the hydraulic systems in an aircraft.

BACKGROUND

Power transfer units (PTUs) are used in various applications for transferring hydraulic fluid from one system to another without sharing fluid between the two systems. For example, PTUs may be used in aircraft hydraulic systems that operate landing gears, thrust reversers, flight control surfaces, brakes, cargo doors, and many other components. The PTU is generally used to ensure control of the aircraft when one of the hydraulic systems has lost or reduced hydraulic power from another pump within the hydraulic system by supplementing power to the inoperable hydraulic system. Independent hydraulic systems may be used for different components, or two independent hydraulic systems may be used for a single component to ensure control of the single component during failure.

PTUs generally include two axial-piston rotating groups that are housed separately and connected by a common driveshaft and mounting adapter. The PTU mechanically couples two hydraulic systems such that, when activated, hydraulic pressure from the first system drives the hydraulic motor which transmits rotational power through the common shaft to the hydraulic pump. The rotational energy is then converted back into hydraulic pressure for the second system. The PTU is restricted from starting in response to high static friction within the unit, or a "breakout" state of the PTU. However, the friction is inherently difficult to control due to performance constraints and certain temperature ranges in aircraft applications. Friction may also vary for different fluid properties that change over the life of the aircraft. Thus, conventional PTUs may be disadvantageous during the breakout state of the aircraft. Still another disadvantage of conventional PTUs is that leakage may occur when the PTU is in a stalled state, which may consequently cause overheating of the system and excessive fuel burning for the aircraft.

SUMMARY OF INVENTION

The present application is directed towards a power transfer unit (PTU) that is connected to two hydraulic systems and is configured to supplement power to one of the hydraulic systems during failure of the hydraulic system. The PTU includes a first hydraulic circuit that corresponds to the first hydraulic system, a second hydraulic circuit that corresponds to the second hydraulic system to be supplemented, and a pump and motor assembly that is connected between the hydraulic circuits. The first hydraulic circuit includes a high-flow isolation valve that is piloted by an arming valve and controls flow to the inlet of the pump and motor assembly. The second hydraulic circuit includes a normally open unloader valve and an orifice that are used to reduce pump pressure from the outlet of the pump and motor assembly during the breakout stage of the PTU when rotation of the PTU starts.

The PTU is particularly advantageous for use in the hydraulic systems for components in an aircraft. The hydraulic circuits are configured to prevent leakage when pressurizing both hydraulic circuits such that the potential for system overheating is reduced and less aircraft fuel is burned. Another advantage of the PTU is reducing or eliminating breakout pressure constraints during the start-up of the PTU for supplementing power to the second hydraulic system, such that the PTU and the hydraulic systems will have smoother operation. Still another advantage of the PTU is that using the arming solenoid valve arms the PTU for operation and operates the isolation valve. By providing the arming valve, conventionally used additional PTU valves may no longer be required such that additional valves, fittings, tubing, installation time, and leakage points may be eliminated.

According to an aspect of the invention, a power transfer unit includes a first hydraulic circuit, a second hydraulic circuit fluidly connected to the first hydraulic circuit, a pump and motor assembly fluidly connected between the first hydraulic circuit and the second hydraulic circuit, and an isolation valve arranged along the first hydraulic circuit and fluidly connected to an inlet of the pump and motor assembly. The isolation valve is movable between a closed position and an open position to prevent and enable high-pressure fluid flow to the inlet, respectively. The power transfer unit includes an unloader valve arranged along the second hydraulic circuit and fluidly connected to an outlet of the pump and motor assembly, and an orifice arranged along the second hydraulic circuit and fluidly connected to the unloader valve to reduce back pressure in the second hydraulic circuit.

According to another aspect of the invention, a method of power transfer from a first hydraulic system to a second hydraulic system includes fluidly connecting a first hydraulic circuit to the first hydraulic system, fluidly connecting a second hydraulic circuit to the second hydraulic system through a pump and motor assembly, arranging an isolation valve along the first hydraulic circuit between the first hydraulic system and an inlet of the pump and motor assembly to isolate high-pressure fluid between the first hydraulic system and the motor inlet, and arranging an unloader valve and an orifice along the second hydraulic circuit between an outlet of the pump and motor assembly and a discharge line of the second hydraulic circuit to reduce back pressure in the second hydraulic circuit.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

DETAILED DESCRIPTION

Aspects of the present invention relate to a power transfer unit (PTU) for transferring hydraulic fluid from one hydraulic system to another hydraulic system without sharing fluid between the two systems. The PTU and power transfer method described herein may be suitable for many different applications that use two or more hydraulic systems to ensure operation when one of the hydraulic systems fails. An example of a suitable application is in an aircraft that uses independent hydraulic systems for operating landing gear, thrust reversers, flight control surfaces, brakes, cargo doors, and other aircraft components. For example, a hydraulic actuation system may be used for extending and retracting a landing gear. The PTU may be arranged for transferring power between different hydraulic systems for different components, or both of the hydraulic systems may be used in operating a single component to ensure control of the single component during a failure state.

Figure 1:
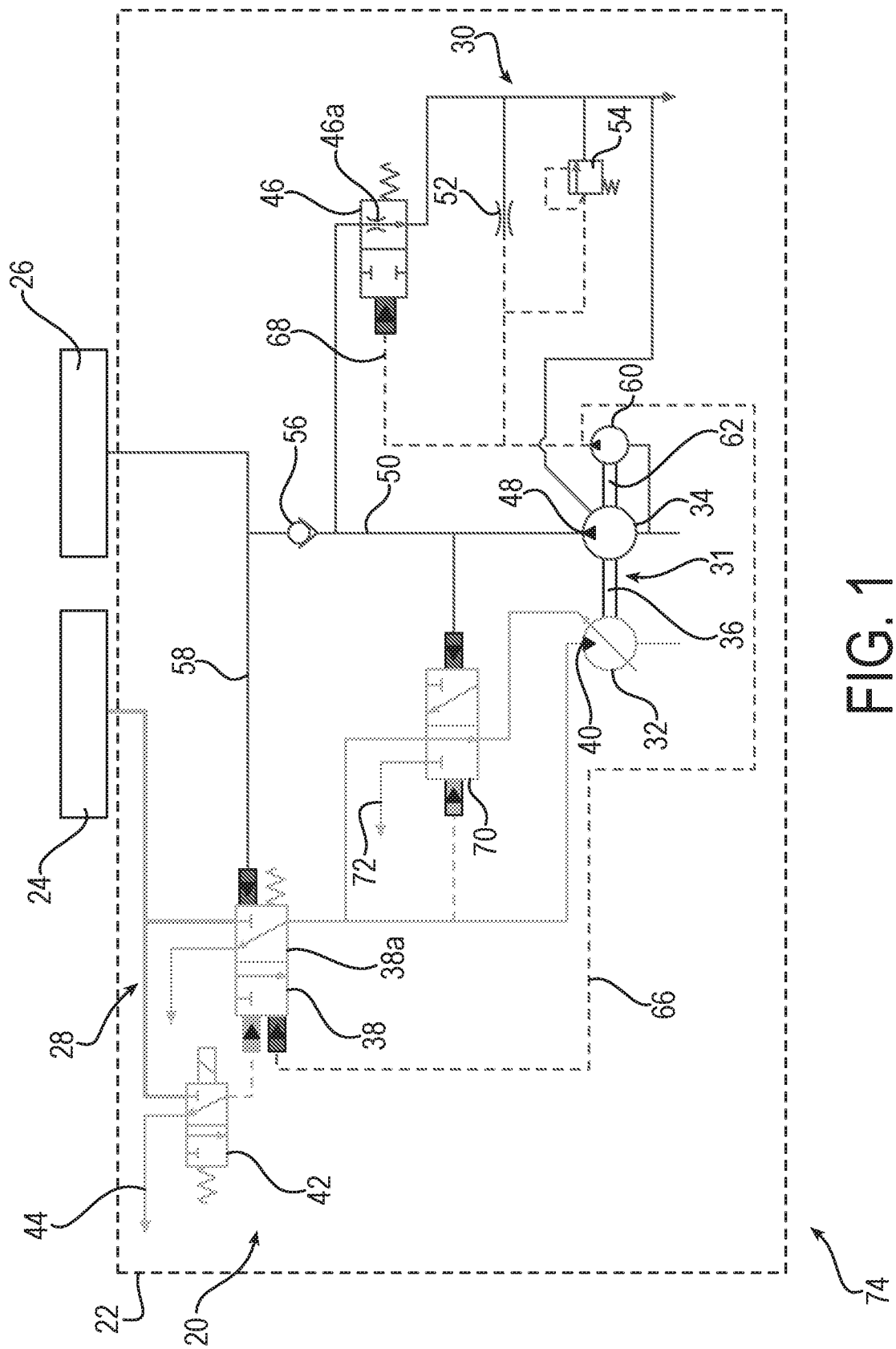
FIG. 1 is a schematic drawing showing an exemplary power transfer unit (PTU) and a hydraulic control circuit in an isolated state in accordance with an aspect of the present invention.

Referring first to FIG. 1, a hydraulic control system 20 in a PTU 22 connected between a first hydraulic system 24 and a second hydraulic system 26 is shown. The first hydraulic system 24 and the second hydraulic system 26 may be configured for operation of different components, such as in an aircraft, or for a single component to enable operation of the component during a failure state. The hydraulic control system 20 includes a first hydraulic circuit 28 that is fluidly connected to the first hydraulic system 24 and a second hydraulic circuit 30 that is fluidly connected to the second hydraulic system 26. In the exemplary embodiment described herein, the first hydraulic circuit 28 is arranged to unidirectionally supplement the second hydraulic circuit 30.

A pump and motor assembly 31 is fluidly connected between the first hydraulic circuit 28 and the second hydraulic circuit 30, and includes a motor 32 and a pump 34 that is rotatably coupled to the motor 32 via a common coupling shaft 36. In an exemplary embodiment, the motor 32 may be arranged along the first hydraulic circuit 28 and the pump 34 may be arranged along the second hydraulic circuit 30. In another exemplary embodiment, the motor 32 may be arranged along the second hydraulic circuit 30 and the pump 34 may be arranged along the first hydraulic circuit 28. The PTU 22 may be suitable for use with in-line pumps, bent axis pumps, or a combination thereof.

The first hydraulic circuit 28 includes an isolation valve 38 that is fluidly connected between the first hydraulic system 24, or a high-pressure source of the first hydraulic system 24, and the motor 32. The isolation valve 38 may be spring-biased in a normally closed position, as shown in FIG. 1, to prevent flow from the hydraulic system 24 from reaching an inlet 40 of the pump and motor assembly 31, such as an inlet of the motor 32, such as during a non-operational state of the PTU 22. The isolation valve 38 is piloted by an arming valve 42 that is arranged along the first hydraulic circuit 28 and fluidly connected between the first hydraulic system 24 and a return line 44. The arming valve 42 may be a three-way normally open solenoid valve that is configured to remove and apply pilot pressure from and to the isolation valve 38 for opening and closing the isolation valve 38. Using the isolation valve 38 is advantageous in enabling an isolated state of the hydraulic control system 20 in which the high-pressure fluid of the first hydraulic system 24 is blocked from reaching the inlet 40 of the pump and motor assembly 31. Thus, the PTU 22 will not rotate or produce any pressure when in the isolated state. For example, the PTU 22 may be non-rotatable during an overheat of the hydraulic system or when a low level of fluid is present in the reservoir of the hydraulic system.

The second hydraulic circuit 30 includes an unloader valve 46 that is fluidly connected to an outlet 48 of the pump and motor assembly 31, such as an outlet of the pump 34. The unloader valve 46 may be a spring-biased normally open valve that is used to reduce the pump pressure during operation of the PTU 22. When the PTU 22 starts to rotate, discharge fluid may flow from the pump 34 to either a discharge line 50 of the second hydraulic circuit 30 or to the unloader valve 46 of the second hydraulic circuit 30. The second hydraulic circuit 30 also includes an orifice 46a that is fluidly connected to the unloader valve 46 such that flow traveling to the unloader valve 46 from the pump 34 will then pass through the orifice 46a. Providing the unloader valve 46 and the orifice 46a is advantageous in reducing back pressure and offloading the pump discharge line 50 to reduce an amount of breakout friction in the PTU 22. The system may also include any suitable check valves that enable unidirectional flow from the pump 34 to the second hydraulic system 26 for supplementing the second hydraulic system 26 while also preventing high-pressure flow from the second hydraulic system 26 from entering the fluid system.

The second hydraulic circuit 30 may further include an orifice 52 and at least one pressure relief valve 54. The orifice 52 is fluidly connected to the outlet of a low-pressure pilot pump of the pump. Providing the pressure relief valve 54 is advantageous in limiting pressure within the pilot system during high-speed rotation of the PTU 22. The second hydraulic system 26 may be communicatively coupled to the isolation valve 38 via a mechanical connection 58 for sending a pilot signal to the isolation valve 38 when pressure in the hydraulic systems 24, 26 is equalized such that the PTU 22 may move to a stopping state.

A low-pressure positive displacement or pilot pump 60 is rotatably coupled with the motor 32 and the pump 34 via a shaft 62 connected to the pump 34. The low-pressure pilot pump 60 may be a small sized fixed displacement low-pressure pilot pump that is used to activate the isolation valve 38 and the unloader valve 46. The low-pressure pilot pump 60 is communicatively coupled to the isolation valve 38 via a connection 66 and to the unloader valve 46 via a connection 68. When the system pressure in the hydraulic systems 24, 26 is equalized, the pressure from the low-pressure pilot pump 60 generates a countering signal. The countering signal counters against the pilot signal that is communicated by the second hydraulic system 26 to the isolation valve 38 via a mechanical connection 58. The compensator valve 70 is fluidly connected to the motor 32, the isolation valve 38 and a return line 72 for automatically regulating or stopping pump flow if the pressure in the pump and motor assembly 31 exceeds a predetermined maximum differential pressure between the hydraulic systems 24, 26.

With further reference to FIG. 2-5, operation of the PTU 22 and the hydraulic control system 20 for transferring power from the first hydraulic system 24 to the second hydraulic system 26, such as during a failure or an emergency operation, occurs as follows. FIG. 1 shows the PTU 22 in an isolated state 74 in which the arming valve 42 is energized to remove pilot pressure from the isolation valve 38. When the pilot pressure is removed from the isolation valve 38, the isolation valve 38 is normally spring-biased in the closed position 38*a*. When the isolation valve 38 is in the closed position 38*a*, high-pressure from the first hydraulic system 24 is prevented from reaching the motor 32 such that the PTU 22 does not rotate or produce pressure. Accordingly, the PTU 22 may have a speed that is zero or nearly zero when in the isolated state 74.

Figure 2:
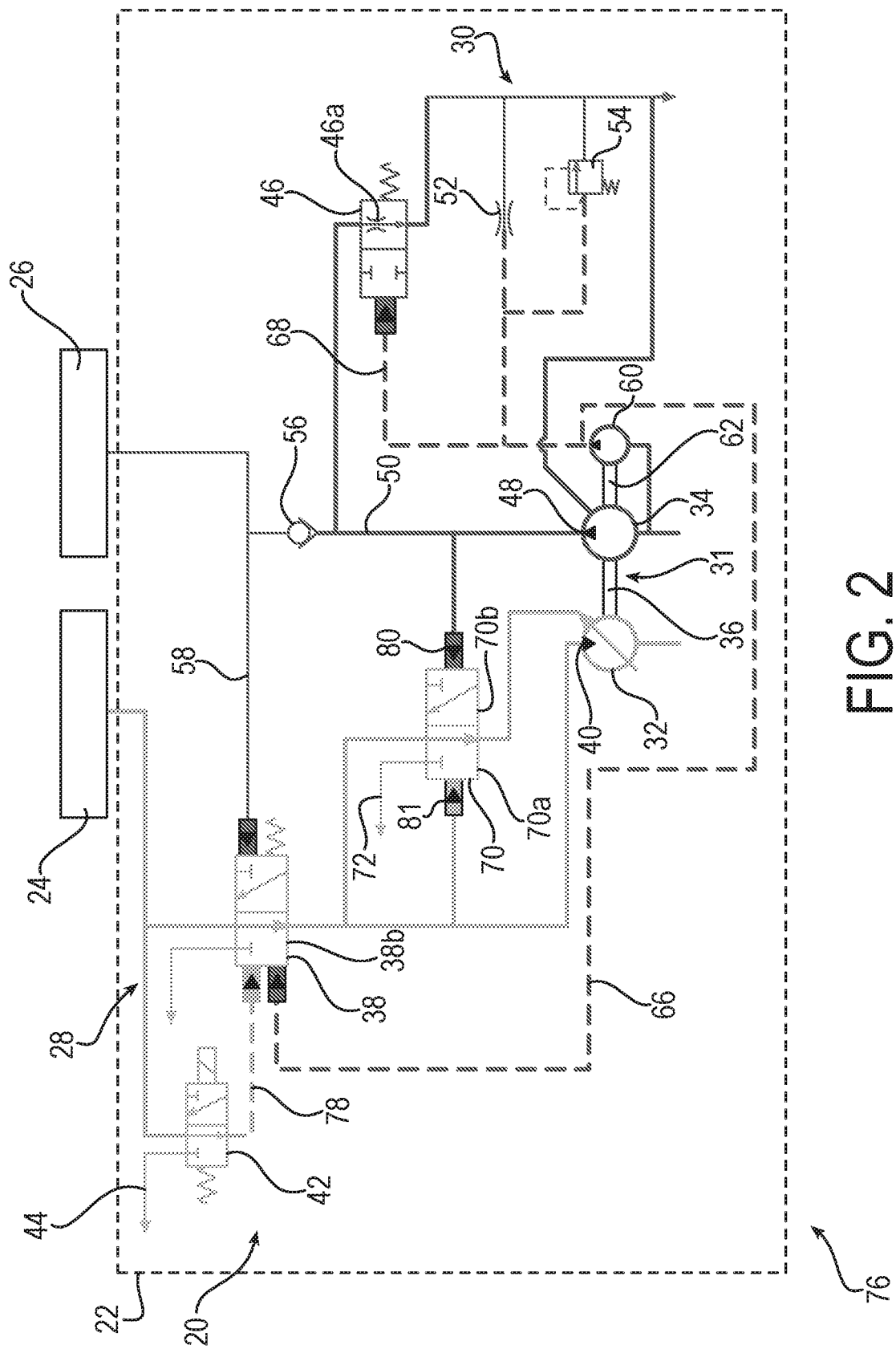
FIG. 2 is a schematic drawing showing the PTU and the hydraulic control circuit of FIG. 1 in a breakout state.

FIG. 2 shows the PTU 22 in a breakout state 76 in which pressure in the second hydraulic system 26 may drop below a predetermined amount, such as during an emergency situation. For example, the second hydraulic system 26 may have a pressure that is between 340 to 685 psi lower as compared with the first hydraulic system 24, such that the PTU 22 is automatically actuated to supplement the second hydraulic system 26 and maintain a predetermined pressure. In an exemplary application, the PTU 22 may be operable to maintain a pressure of 3000 psi during the emergency situation. When the arming valve 42 is de-energized, the pilot pressure is applied to the isolation valve 38 via a communication line 78 to transition the isolation valve 38 to an open position 38*b*. When the isolation valve 38 is open, high-pressure fluid from the first hydraulic system 24 will flow to the inlet 40 of the motor 32. The high-pressure in the system will start rotation of the motor 32, the pump 34, and the low-pressure pilot pump 60.

As the PTU 22 starts to rotate, fluid will be discharged from the pump 34. Fluid may flow from the outlet 48 of the pump 34 to either the discharge line 50 or to the unloader valve 46 which is in a normally open position 46*a*. The fluid flow traveling to the unloader valve 46 may pass through the unloader valve 46 and then through an orifice 52 arranged in the second hydraulic circuit 30. The fluid flow may further pass through the pressure relief valve 54. Using the unloader valve 46 and the orifice 46*a* will reduce back pressure in the system as compared with the pressure in the discharge line 50, such that the breakout friction of the PTU 22 will be reduced for a more stable control during the operation of the PTU 22.

When the PTU 22 is in the breakout state 76, the compensator valve 70 may be configured to receive a signal 80 from the pump 34 pertaining to an amount of pressure in the second hydraulic circuit 30 and a signal 81 pertaining to the amount of pressure in the first hydraulic circuit 28. The compensator valve 70 may compare the pressures and is configured to move between an open position 70*a* and a closed position 70*b* in which fluid flows from the motor 32 to the return line 72, such that the compensator valve 70 is used to enable stability and further control of flow through the pump and motor assembly 31. The check valve 56 is also used to control flow through the system in that if the pressure in the second hydraulic system 26 is high, the check valve 56 is unidirectional and operable to prevent high-pressure from entering the system.

Figure 3:
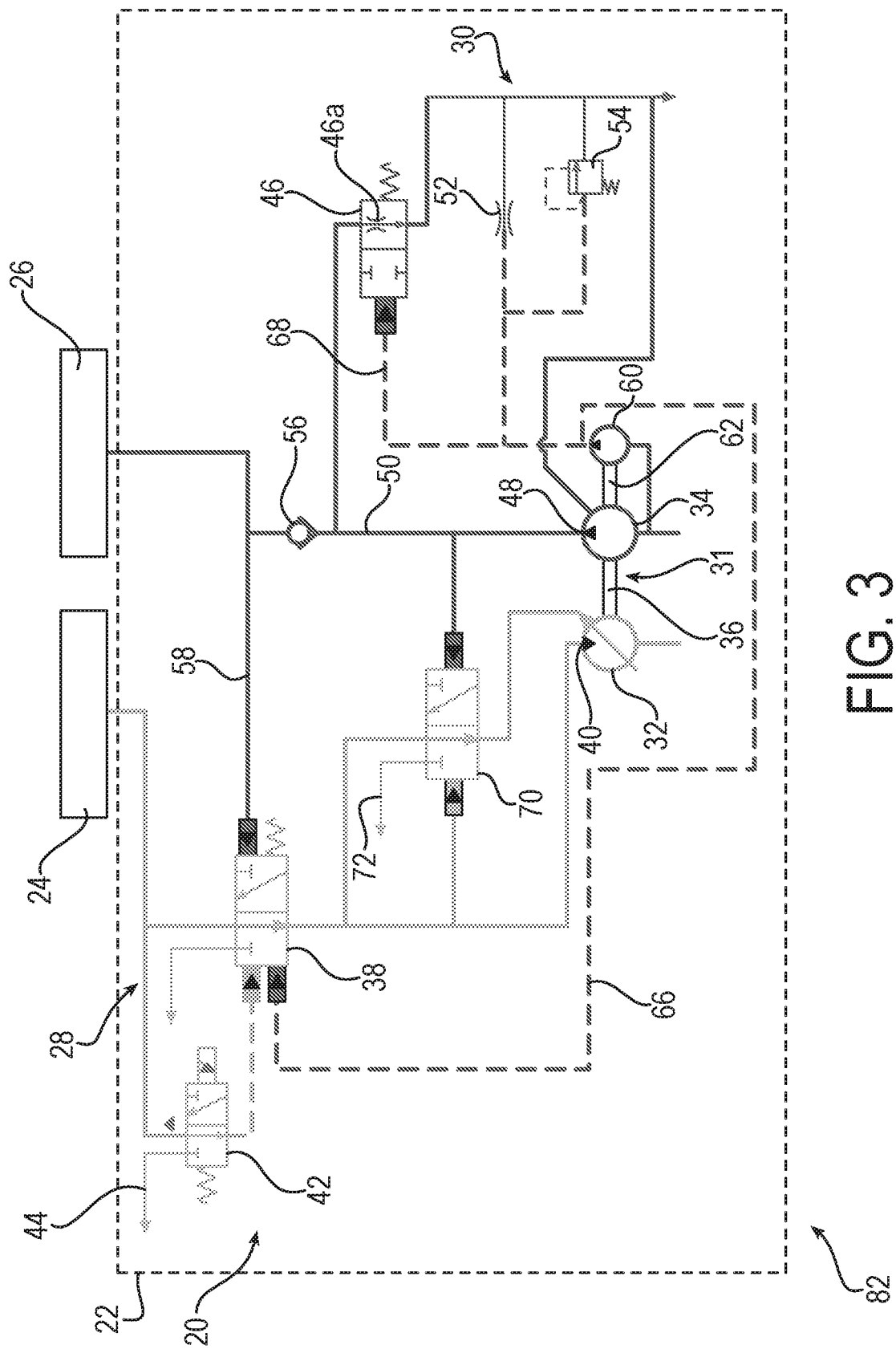
FIG. 3 is a schematic drawing showing the PTU and the hydraulic control circuit of FIG. 1 in a low-power operation state.

FIG. 3 shows a low-power state 82 of the PTU 22, which occurs after the breakout state 76 and during which the PTU 22 is operable at a low speed for supplying power to the second hydraulic system 26. During the low-power state 82, for example, the demand of the second hydraulic system 26 may be between 15 and 30 liters per minute. As the PTU 22 rotates, the fluid that is discharged from the pump 34 will increase pressure in the second hydraulic circuit 30 to supply power to the second hydraulic system 26, such as during an emergency operation. The fluid flows from the pump 34 and through the unidirectional check valve 56 to the second hydraulic system 26. Fluid flow will continue to travel through the unloader valve 46. The flow through the unloader valve 46 maintains the rotational speed of the PTU 22 as the second hydraulic system 26 is supplemented by the PTU 22. Using the unloader valve circuit, including the unloader valve 46, the orifice 52 and the pressure relief valve 54, is particularly advantageous in preventing stops in rotation or "chugging" to maintain a smooth operation of the PTU 22.

Figure 4:
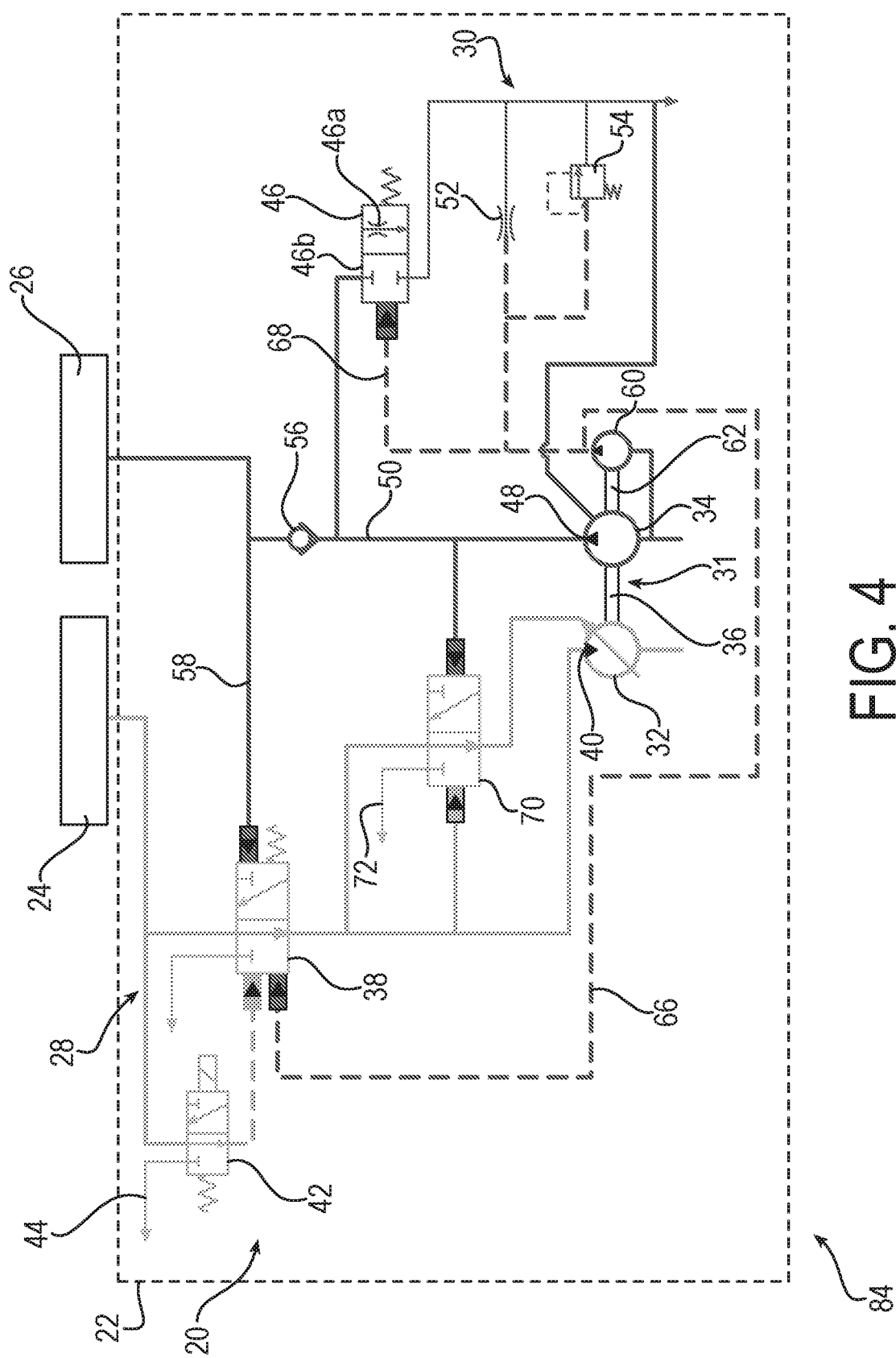
FIG. 4 is a schematic drawing showing the PTU and the hydraulic control circuit of FIG. 1 in a high-power operation state.

FIG. 4 shows a high-power state 84 in which the PTU 22 continues to increase rotational speed from a low speed to a medium or high speed. During the high-power state 84, for example, the demand of the second hydraulic system 26 may be between 30 and 102 liters per minute. The pump and motor assembly 31 continues to receive fluid flow from the open isolation valve 38. As the PTU 22 increases in speed, the low-pressure pilot pump 60 increases flow and pressure output from the pump and motor assembly 31 which overcomes the spring force and provides pilot pressure to the unloader valve 46, via a connection 68, such that the unloader valve 46 moves from an open position 46*a* to a closed position 46*b*. When in the closed position 46*b*, fluid flow is blocked from passing through the normally open unloader valve 46. When in the high-power state 84, the PTU 22 has reached an optimal speed such that all of the fluid that is flowing out of the pump 34 may flow out of the PTU 22 directly through the discharge line 50.

Figure 5:
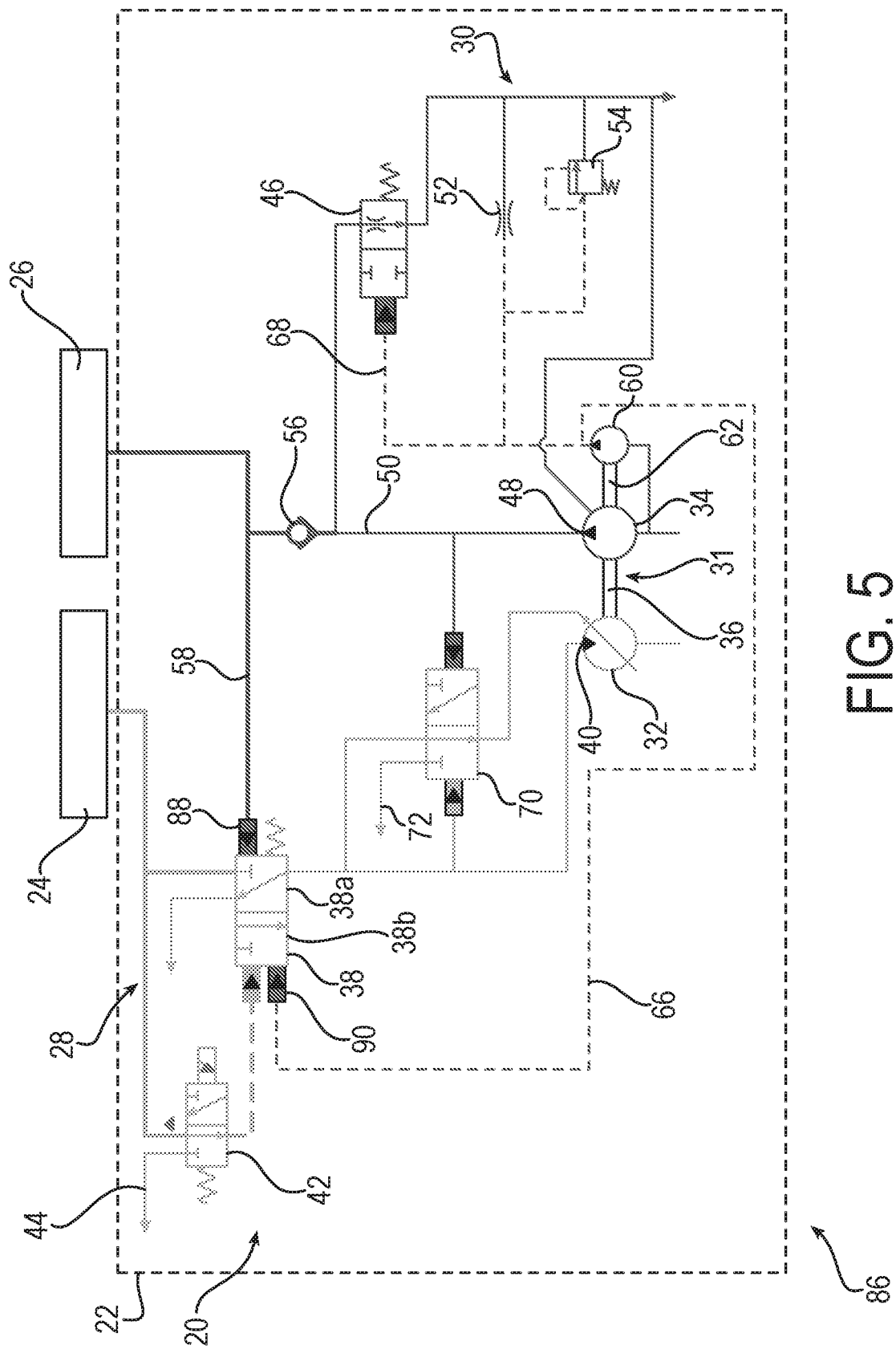
FIG. 5 is a schematic drawing showing the PTU and the hydraulic control circuit of FIG. 1 in a stopping state.

FIG. 5 shows a stopping state 86 in which pressure has been equalized between the first hydraulic system 24 and the second hydraulic system 26. During the stopping state 86, for example, the demand of the second hydraulic system 26 may be less than 15 liters per minute and the difference in pressure between the first hydraulic system 24 and the second hydraulic system 26 may fall below 350 psi. Thus, the PTU 22 may be operated to move to the stopping state 86. When the pressure is equalized, rotation of the PTU 22 becomes slower. The second hydraulic system 26 will send a pilot signal 88 to the isolation valve 38 and the pressure from the low-pressure pilot pump 60 will provide a countering signal 90 to the isolation valve 38 to continue low speed stable operation of the unit to prevent the unit from prematurely shutting off if additional flow is needed. When the high-pressure pilot signal 88 overcomes the countering signal 90, the high-pressure pilot signal 88, via the mechanical connection 58, will transition the isolation valve 38 to the closed position 38a in which fluid flow is prevented from reaching the motor 32 and rotation of the PTU 22 is stopped. The isolation valve 38 may be damped when moving from the open position 38b, i.e. the run state, to the closed position 38a, i.e. the isolated state, such that the transition is smooth. In the event that the pressure in the second hydraulic system 26 again falls to less than 350 psi below the pressure of the first hydraulic system 24, the PTU 22 will return to the breakout state 76 of FIG. 2.

Figure 6:
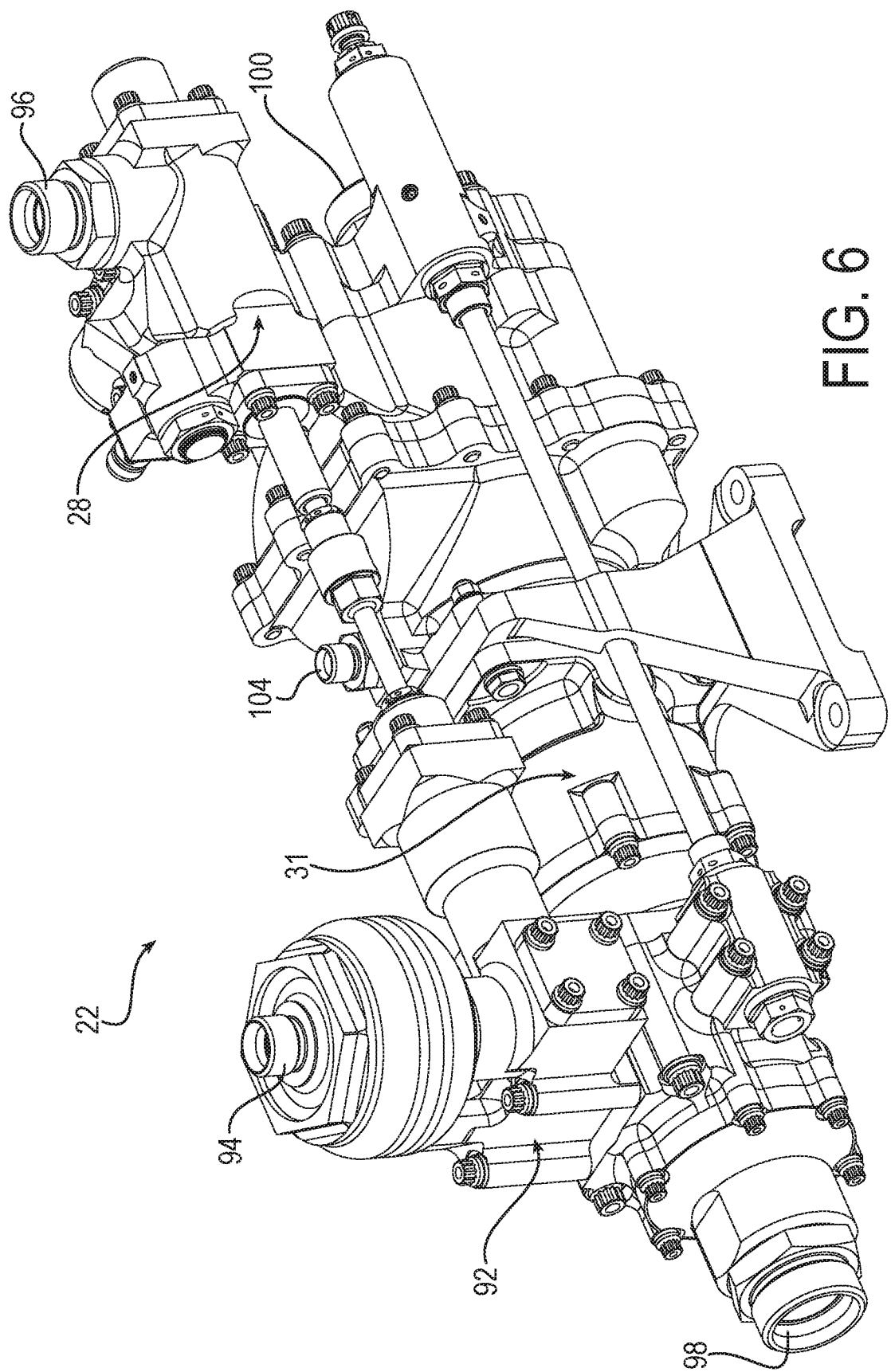
FIG. 6 is a sectional view of the PTU of FIG. 1.
Figure 7:
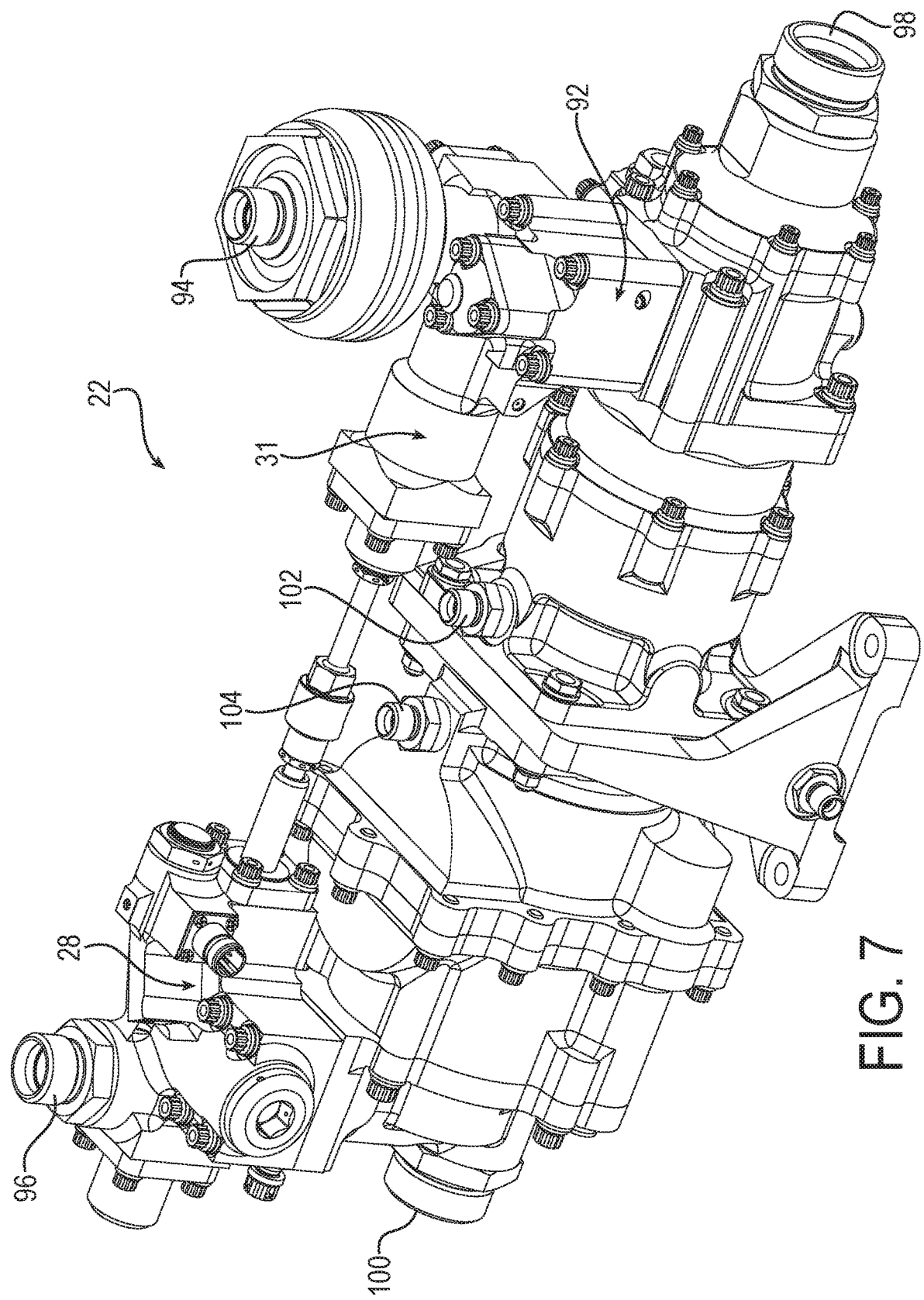
FIG. 7 is another sectional view of the PTU of FIG. 6.
Figure 8:
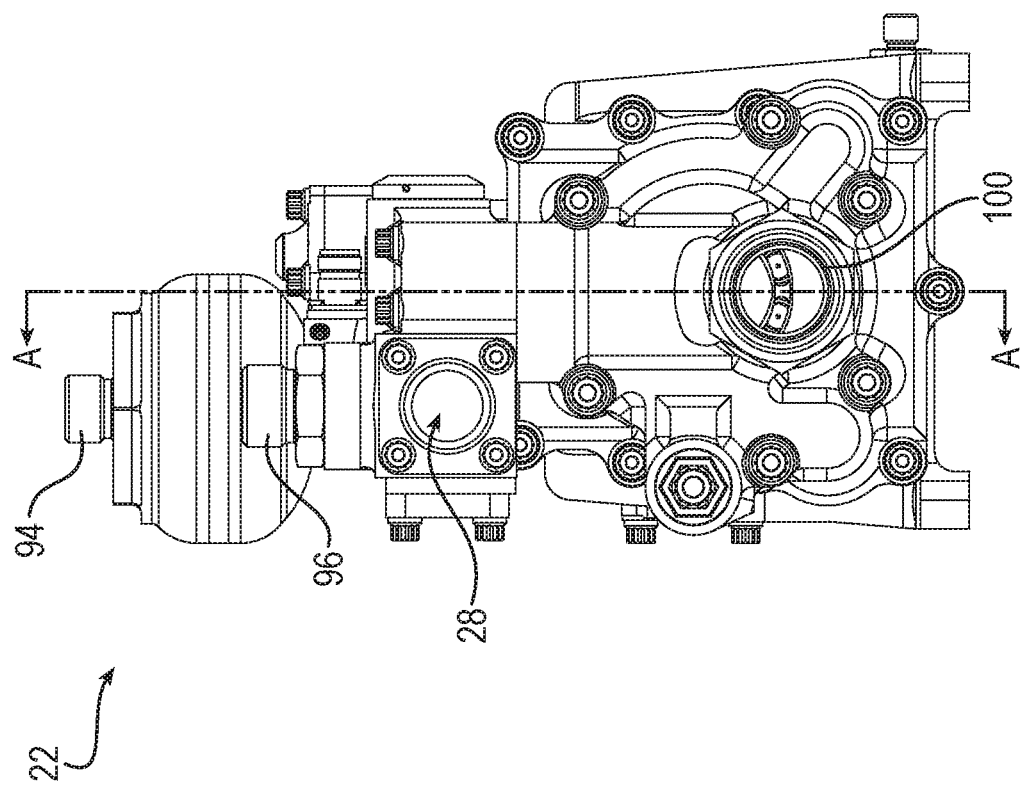
FIG. 8 is a sectional view of a front of the PTU of FIG. 6.

Referring now to FIGS. 6-13, various views of the PTU 22 including the hydraulic control system 20 of FIGS. 1-5 are shown. FIGS. 6-8 show various views of the outside of a PTU case 92 in which the first hydraulic circuit, the second hydraulic circuit, and the pump and motor assembly are housed. The PTU case 92 may define high-pressure ports 94, 96, low-pressure ports 98, 100, and case drain ports 102, 104 that each corresponds to one of the first hydraulic circuit 28 and the second hydraulic circuit 30, as shown in FIGS. 1-5, and are configured to receive fluid flow therethrough. The ports 94, 98 and 102 may correspond to the second hydraulic circuit 30 and the second hydraulic system 26, as shown in FIG. 1-5, and the ports 96, 100 and 104 may correspond to the first hydraulic system 24, as shown in FIGS. 1-5. The PTU case 92 may be formed of separate housings and adapters that are bolted or attached together to enclose the PTU 22.

Figure 9:
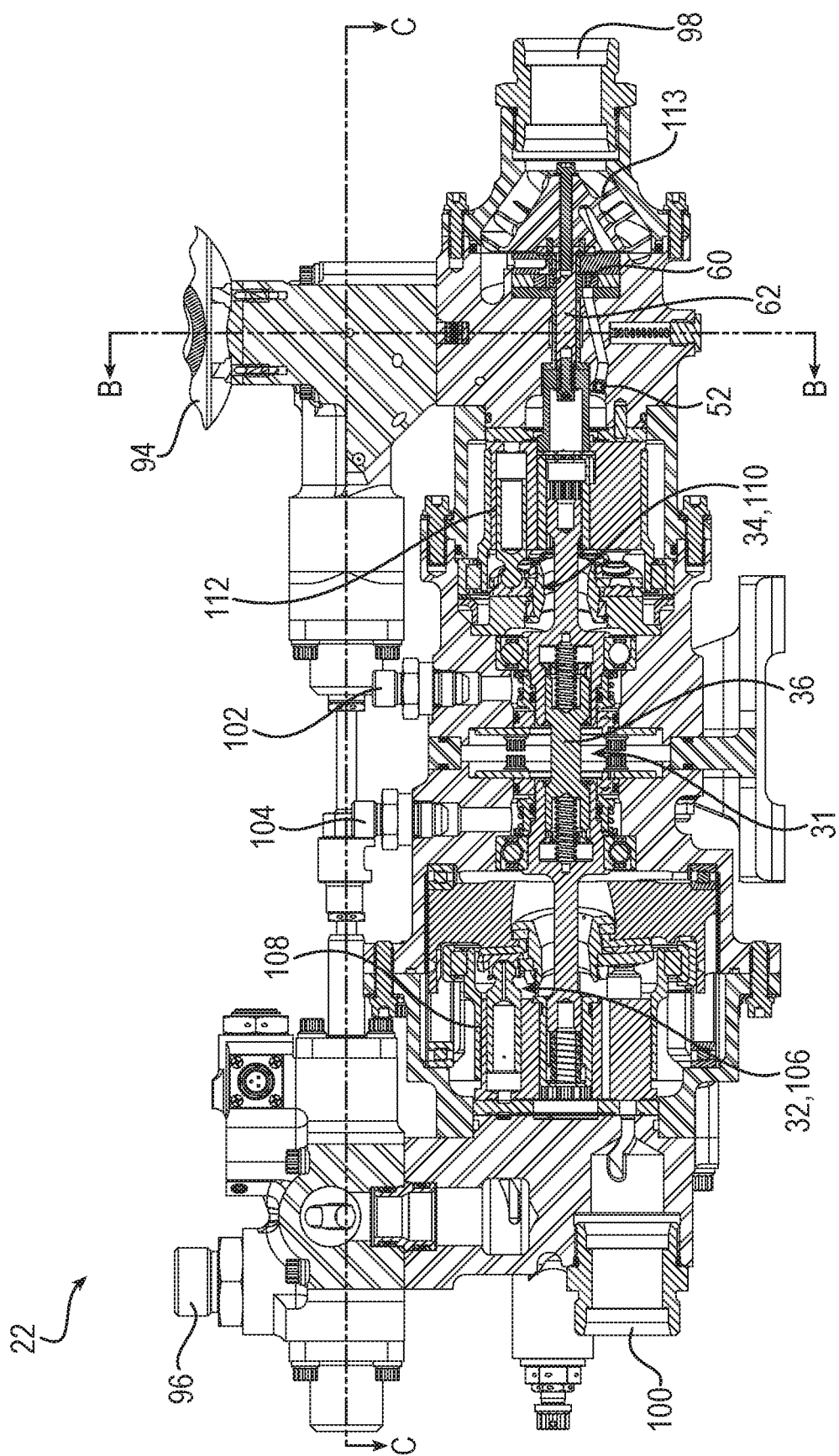
FIG. 9 is a cross-sectional view of the PTU of FIG. 8 taken along a cut line A-A and showing the power transfer unit having two axial piston assemblies.

FIGS. 9-13 show cross-sectional views of the PTU 22. FIG. 9 is a cross-sectional view as taken along cut line A-A of FIG. 8. As shown in FIG. 9, the PTU 22 includes a first axial piston assembly 106 having a first cylinder block 108 and a second axial piston assembly 110 having a second cylinder block 112. The first axial piston assembly 106 and the second axial piston assembly 110 correspond to the pump and motor assembly 31 shown in FIGS. 1-5. For example, the first axial piston assembly 106 may correspond to the motor 32 and the second axial piston assembly 110 may correspond to the pump 34 that is rotatably coupled to the motor 32 along the shaft 36. In another exemplary embodiment, at least one of the axial piston assemblies 106, 110 may be arranged along a bent axis. The PTU 22 further includes the low-pressure pilot pump 60 rotatably coupled to the pump 34 along the shaft 62, and an impeller 113. The fluid flowing from the low-pressure pilot pump 60 may also flow through the orifice 52 arranged along the second hydraulic circuit 30 prior to discharge. The fluid may flow from the low-pressure pilot pump 60 through the pressure relief valve 54 to the case drain port as the speed of the unit increases due to increased flow from the low-pressure pilot pump 60.

Figure 10:
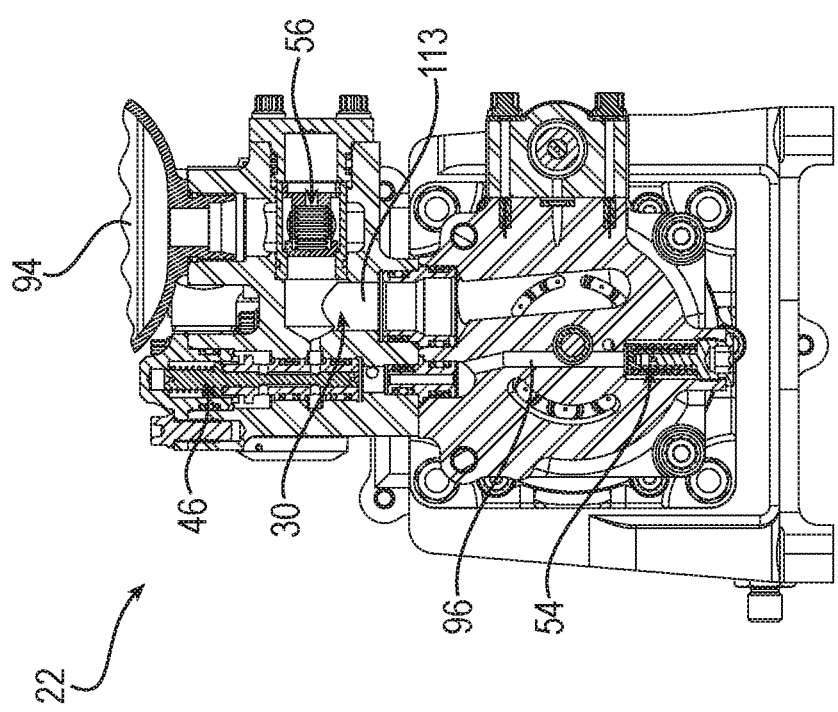
FIG. 10 is a cross-sectional view of the PTU of FIG. 9 taken along a cut line B-B and showing a hydraulic circuit of the power transfer unit that corresponds to one of the two axial piston assemblies and a hydraulic system to be supplemented by the PTU.

FIG. 10 shows a cross-sectional view of the PTU 22 taken along a cut line B-B of FIG. 9. FIG. 10 shows the high-pressure port 94 and the second hydraulic circuit 30. The second hydraulic circuit 30 includes the unloader valve 46, the pressure relief valve 54, and the check valve 56, as schematically shown in FIGS. 1-5. The second hydraulic circuit 30 further includes a fluid passage 113 that is configured to receive fluid from the second axial piston assembly 110, or the pump 34, and through which the fluid flows to the high-pressure port 94 for the second hydraulic system and the unloader valve 46.

Figure 11:
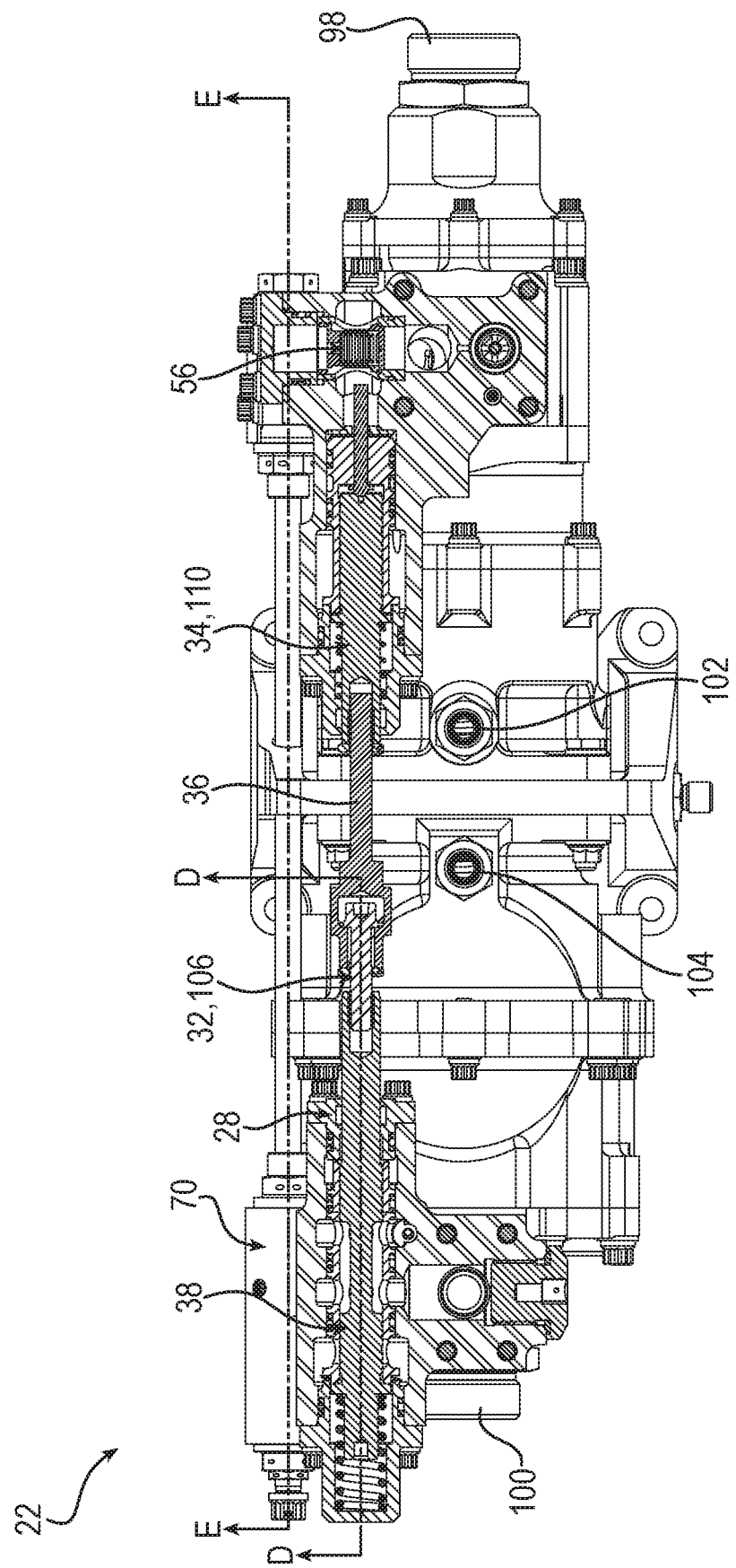
FIG. 11 is a cross-sectional view of the PTU of FIG. 9 taken along a cut line C-C and showing another portion of the hydraulic circuit of the PTU.
Figure 12:
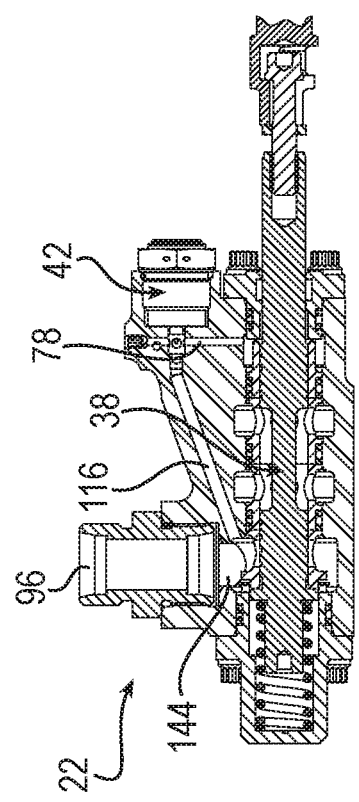
FIG. 12 is a cross-sectional view of the PTU of FIG. 11 taken along a cut line D-D and showing an isolation valve of the hydraulic circuit.

Referring now to FIGS. 11 and 12, FIG. 11 shows a cross-sectional view of the PTU 22 taken along a cut line C-C of FIG. 9 and FIG. 12 shows a cross-sectional view of the PTU 22 taken along a cut line D-D of FIG. 11. FIGS. 11 and 12 show the case drain ports 102, 104, the low-pressure ports 98, 100, the isolation valve 38, and the check valve 56. As shown in FIG. 11, the first hydraulic circuit 28 includes the isolation valve 38 that is connected with the motor 32 or the first axial piston assembly 106 which is coupled with the second axial piston assembly 110, or the pump 34. As shown in FIG. 12, the first hydraulic circuit 28 also includes the arming valve 42 that pilots the isolation valve 38 as described above. FIG. 12 also shows the high-pressure port 96 being fluidly connected to the isolation valve 38 and the arming valve 42 via fluid paths 114, 116. The communication line 78 between the arming valve 42 and the isolation valve 38 for piloting the isolation valve 38 is also shown.

Figure 13:
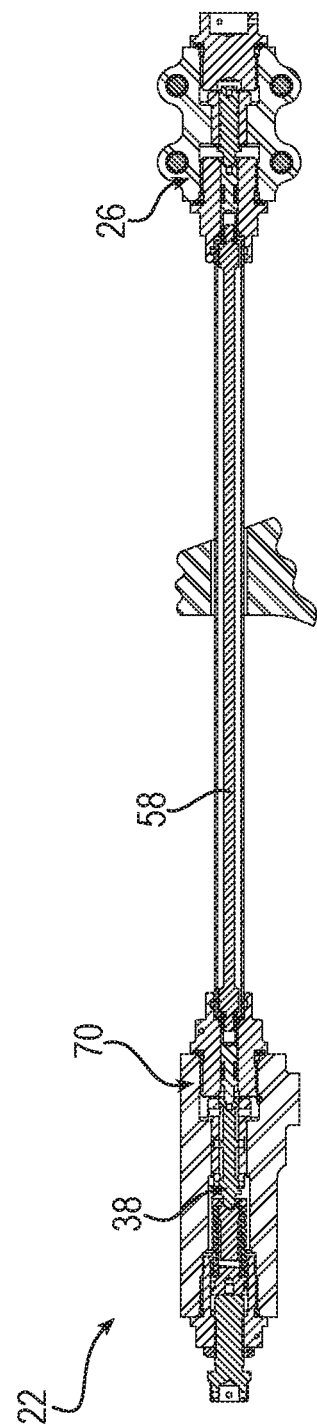
FIG. 13 is a cross-sectional view of the PTU of FIG. 11 taken along a cut line E-E and showing a connection between the isolation valve and a hydraulic system to be supplemented by the PTU.

With further reference to FIG. 13, FIG. 13 shows a cross-sectional view of the PTU 22 taken along cut line E-E of FIG. 11. FIGS. 11 and 13 show the compensator valve 70 that is arranged along the first hydraulic circuit 28 and fluidly coupled to the isolation valve 38. FIG. 13 also shows the mechanical connection 58 for sending a pilot signal from the second hydraulic system 26 to the isolation valve 38.

Using the PTU with the hydraulic control system described herein is advantageous in preventing leakage when pressurizing both hydraulic circuits such that the potential for system overheating is reduced and less aircraft fuel is burned. In an exemplary application, the PTU may have a leakage that is less than 50 cubic centimeters per minute at 3000 psi which will further result in cost savings during operation. Another advantage of the PTU and the hydraulic control system is using the unloader valve and isolation valve to reduce or eliminate breakout pressure constraints during the start-up of the PTU. Still another advantage of the PTU and the hydraulic control system is that using the arming solenoid valve arms the PTU for operation and operates the isolation valve. By providing the arming solenoid valve in the PTU, conventional PTU valves may no longer be required such that additional valves, fittings, tubing, installation time, and leakage points may all be eliminated.

A power transfer unit includes a first hydraulic circuit, a second hydraulic circuit fluidly connected to the first hydraulic circuit, a pump and motor assembly fluidly connected between the first hydraulic circuit and the second hydraulic circuit, an isolation valve arranged along the first hydraulic circuit and fluidly connected to an inlet of the pump and motor assembly, with the isolation valve being movable between a closed position and an open position to prevent and enable high-pressure fluid flow to the inlet, respectively, an unloader valve arranged along the second hydraulic circuit and fluidly connected to an outlet of the pump and motor assembly, and an orifice arranged along the second hydraulic circuit and fluidly connected to the unloader valve to reduce back pressure in the second hydraulic circuit.

The power transfer unit may include an arming valve arranged along the first hydraulic circuit for piloting the isolation valve.

The arming valve may be a three-way normally open solenoid valve.

The power transfer unit may include a fluid pressure source that is fluidly connected to the arming valve and the isolation valve.

The power transfer unit may include a low-pressure pilot pump arranged along the second hydraulic circuit and coupled for rotation with the pump and motor assembly.

The low-pressure pilot pump may be communicatively coupled to the unloader valve and the isolation valve.

The low-pressure pilot pump may be a gerotor.

The power transfer unit may include a check valve arranged along the second hydraulic circuit.

The power transfer unit may include a fluid pressure source fluidly connected to the second hydraulic circuit, with the check valve being fluidly connected between the outlet of the pump and motor assembly and the fluid pressure source.

The fluid pressure source may be communicatively coupled to the isolation valve via a mechanical connection.

The power transfer unit may include a compensator valve that is arranged along the first hydraulic circuit and fluidly connected to the isolation valve.

The outlet of the pump and motor assembly may be communicatively coupled with the compensator valve.

The first hydraulic circuit and the second hydraulic circuit may be arranged for unidirectional flow from the first hydraulic circuit to the second hydraulic circuit.

The unloader valve may be spring-biased in a normally open position.

The isolation valve may be spring-biased in a normally closed position.

The power transfer unit may include a relief valve arranged along the second hydraulic circuit.

The pump and motor assembly may include a motor arranged along the first hydraulic circuit and a pump arranged along the second hydraulic circuit.

An aircraft control system includes a first hydraulic system and a second hydraulic system independent from the first hydraulic system, with the power transfer unit as described herein being connected between the first hydraulic system and the second hydraulic system for transferring power between the first hydraulic system and the second hydraulic system.

A method of power transfer from a first hydraulic system to a second hydraulic system includes fluidly connecting a first hydraulic circuit to the first hydraulic system, fluidly connecting a second hydraulic circuit to the second hydraulic system through a pump and motor assembly, arranging an isolation valve along the first hydraulic circuit between the first hydraulic system and an inlet of the pump and motor assembly to isolate a high-pressure fluid between the first hydraulic system and the inlet, and arranging an unloader valve and an orifice along the second hydraulic circuit between an outlet of the pump and motor assembly and a discharge line of the second hydraulic circuit to reduce back pressure in the second hydraulic circuit.

The method may include fluidly connecting an arming solenoid valve to the isolation valve, and rotatably coupling a low-pressure pilot pump to the pump and motor assembly along the second hydraulic circuit.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A power transfer unit comprising:
   a first hydraulic circuit;
   a second hydraulic circuit operatively coupled to the first hydraulic circuit;
   a pump and motor assembly fluidly connected between the first hydraulic circuit and the second hydraulic circuit;
   an isolation valve arranged along the first hydraulic circuit and fluidly connected to an inlet of the pump and motor assembly, wherein the isolation valve is movable between a closed position and an open position to prevent and enable high-pressure fluid flow to the inlet, respectively;
   an unloader valve arranged along the second hydraulic circuit and fluidly connected to an outlet of the pump and motor assembly;
   an orifice arranged along the second hydraulic circuit and fluidly connected to the unloader valve to reduce back pressure in the second hydraulic circuit; and
   an arming valve arranged along the first hydraulic circuit for piloting the isolation valve, wherein the arming valve is a three-way normally open solenoid valve.

2. The power transfer unit of claim 1 further comprising a low-pressure pilot pump arranged along the second hydraulic circuit and coupled for rotation with the pump and motor assembly.

3. The power transfer unit of claim 2, wherein the low-pressure pilot pump is communicatively coupled to the unloader valve and the isolation valve.

4. The power transfer unit of claim 3, wherein the low-pressure pilot pump is a gerotor.

5. The power transfer unit of claim 1 further comprising a check valve arranged along the second hydraulic circuit.

6. The power transfer unit of claim 1 further comprising a compensator valve that is arranged along the first hydraulic circuit and fluidly connected to the isolation valve.

7. The power transfer unit of claim 6, wherein the outlet of the pump and motor assembly is communicatively coupled with the compensator valve.

8. The power transfer unit of claim 1, wherein the first hydraulic circuit and the second hydraulic circuit are arranged for unidirectional flow from the first hydraulic circuit to the second hydraulic circuit.

9. The power transfer unit of claim 1, wherein the unloader valve is spring-biased in a normally open position.

10. The power transfer unit of claim 1, wherein the isolation valve is spring-biased in a normally closed position.

11. The power transfer unit of claim 1 further comprising a relief valve arranged along the second hydraulic circuit.

12. The power transfer unit of claim 1, wherein the pump and motor assembly includes a motor arranged along the first hydraulic circuit and a pump arranged along the second hydraulic circuit.

13. An aircraft control system comprising:
    a first hydraulic system; and
    a second hydraulic system independent from the first hydraulic system;
    wherein a power transfer unit according to claim 1 is connected between the first hydraulic system and the second hydraulic system for transferring power between the first hydraulic system and the second hydraulic system.

14. A power transfer unit comprising:

a first hydraulic circuit;

a second hydraulic circuit operatively coupled to the first hydraulic circuit;

a pump and motor assembly fluidly connected between the first hydraulic circuit and the second hydraulic circuit;

an isolation valve arranged along the first hydraulic circuit and fluidly connected to an inlet of the pump and motor assembly, wherein the isolation valve is movable between a closed position and an open position to prevent and enable high-pressure fluid flow to the inlet, respectively;

an unloader valve arranged along the second hydraulic circuit and fluidly connected to an outlet of the pump and motor assembly;

an orifice arranged along the second hydraulic circuit and fluidly connected to the unloader valve to reduce back pressure in the second hydraulic circuit; and a low-pressure pilot pump arranged along the second hydraulic circuit and coupled for rotation with the pump and motor assembly, wherein the low-pressure pilot pump is communicatively coupled to the unloader valve and the isolation valve.

15. The power transfer unit of claim 14, wherein the low-pressure pilot pump is a gerotor.

* * * * *